United States Patent [19]
Miller et al.

[11] Patent Number: 4,634,732
[45] Date of Patent: Jan. 6, 1987

[54] THERMOPLASTIC MOLDING COMPOSITIONS

[75] Inventors: Curtis M. Miller, Parkersburg; Charles L. Myers, Vienna, both of W. Va.; Charles F. Parsons, Little Hocking, Ohio

[73] Assignee: Borg-Warner Chemicals, Inc., Parkersburg, W. Va.

[21] Appl. No.: 762,889

[22] Filed: Aug. 6, 1985

[51] Int. Cl.$^4$ .................. C08L 51/00; C08L 69/00
[52] U.S. Cl. .................. 524/504; 525/64; 525/67; 525/69; 525/71
[58] Field of Search .......... 525/64, 67, 74, 404, 525/105, 187, 69; 524/275, 377, 504

[56] References Cited

U.S. PATENT DOCUMENTS

| | | | |
|---|---|---|---|
| 3,642,949 | 2/1972 | Stafford et al. | 260/876 R |
| 3,817,900 | 6/1974 | Higuchi et al. | 260/30.4 R |
| 4,159,975 | 7/1979 | Praetorius et al. | 525/91 |
| 4,197,376 | 4/1980 | Lee et al. | 260/876 R |
| 4,205,140 | 5/1980 | Liebig et al. | 525/67 |
| 4,228,046 | 10/1980 | Lee, Jr. | 260/525 |
| 4,269,950 | 5/1981 | Abolins et al. | 525/525 |
| 4,329,272 | 5/1982 | Dufour | 524/525 |
| 4,367,310 | 1/1983 | Henton | 525/525 |
| 4,487,881 | 12/1984 | Rawlings et al. | 525/67 X |
| 4,524,179 | 6/1985 | Vaughan | 525/525 |

FOREIGN PATENT DOCUMENTS

| | | |
|---|---|---|
| 1133544 | 4/1959 | Fed. Rep. of Germany . |
| 887353 | 4/1960 | United Kingdom . |
| 1315219 | 5/1973 | United Kingdom . |

OTHER PUBLICATIONS

Encyclopedia of Polymer Science & Technology, J. Wiley & Sons, Inc., vol. 6, pp. 145, 156–162, 166–167; vol. 8, pp. 325–338, 1967.

Modern Plastics Encyclopedia, McGraw-Hill, Inc., 1982–1983, pp. 182, 184, 186–187; 1983–1984, pp. 148, 150; 1984–1984, pp. 154, 157–158; 1985–1986, pp. 156–158, 160, 162, 164.

*Primary Examiner*—Theodore E. Pertilla
*Attorney, Agent, or Firm*—Emily A. Richeson

[57] ABSTRACT

A thermoplastic molding composition is provided wherein the composition comprises an ABS copolymer, a copolymer of an unsaturated dicarboxylic acid anhydride, and a minor portion of an alkylene oxide copolymer.

16 Claims, No Drawings

THERMOPLASTIC MOLDING COMPOSITIONS

BACKGROUND OF THE INVENTION

The present invention relates generally to thermoplastic molding compositions which comprise a blend of an ABS copolymer and a copolymer of an unsaturated dicarboxylic acid anhydride, and a minor portion of an alkylene oxide copolymer. The present invention also relates to such thermoplastic compositions wherein the blend additionally includes a polycarbonate.

Blends of ABS copolymers and unsaturated dicarboxylic acid anhydride copolymers, alone or in combination with other resins such as polycarbonates, are well known and commercially available as thermoplastic molding compositions. These compositions are desirable for many uses due to their improved dimensional stability at elevated temperatures in comparison to many conventional ABS or polystyrene compositions, and may be molded into a variety of useful articles, such as automobile grills and trim, housings for telephones and computers, and other household and business appliances.

A part molded from such a composition should have a smooth, even surface appearance, as covering the part surface to hide surface defects, such as by painting, adds to the cost of the product. Even when a part will necessarily be plated or coated prior to use, such as "bright work" on automobiles, surface defects in the part may be translated through the plating or coating to the part's final finish, making the part unacceptable. Although parts may be rejected merely for aesthetic reasons, surface defects, such as splay or streaking, are also a concern because they may signify the occurence of degradation in the plastic composition, resulting in weakening of the part's physical properties. For these reasons parts which display significant surface defects are usually discarded, thereby increasing the overall cost of the product.

Although virtually all thermoplastic compositions will exhibit surface defects if processed under conditions which are sufficiently severe, this problem is particularly acute with resins containing unsaturated discarboxylic acid anhydrides, especially when in combination with nitrile containing resins.

ABS/anhydride copolymer blends also often exhibit a pronounced tendency, when melted, to "stick" or adhere to metal surfaces, such as those commonly found in mixing and molding equipment. Stickiness and surface defects in such resins frequently are the result of the occurence of crosslinking, polymer degradation and volatile evolution in the resin composition. Such phenomena are particularly pronounced at elevated temperatures, such as those at which the composition is mixed and molded, and are a significant deficiency in current commercial anhydride/ABS blends.

Degradation or splay at elevated temperatures is a significant disadvantage because many molders run their molding equipment at as high a temperature as is consistent with molding an acceptable product in order to maximize the speed of the molding operation. A product which develops significant splay at high temperatures is therefore much less desirable than one which can be molded at a higher temperature without developing significant surface defects.

Adhesion of the blend to metal surfaces may be disadvantageous for several reasons. As is readily apparent, adhesion or "sticking" usually will increase the time required to achieve adequate mixing of the blend. As at least some of the factors causing surface defects are dependent upon time and temperature, prolonged mixing may contribute to surface defects, as well as decreasing through-put of the mixing operation. Material which remains stuck inside equipment after mixing or molding may degrade further, thereby necessitating cleaning of the equipment prior to processing of more material. Sticking is a particular problem with Banbury mixers and roll mills, and may also be a problem with twin screw extruders. Particularly in view of the fact that Banbury mixers and roll mills are used in a substantial portion of current resin and part production, an ABS/anhydride polymer blend with a reduced tendency to adhere to metal surfaces and a reduced tendency to develop surface defects offers many significant practical advantages.

SUMMARY OF THE INVENTION

The present invention is a thermoplastic molding composition which comprises (a) 100 parts by weight of a blend of an ABS copolymer and a copolymer of an unsaturated dicarboxylic acid anhydride, and (b) about 0.1 to about 5 parts by weight of an alkylene oxide copolymer. This blend may additionally include a polycarbonate. The alkylene oxide copolymer which is most preferred is a block copolymer of ethylene oxide and propylene oxide.

It has been found that compositions formulated consistent with this invention may exhibit reduced adhesion to metal surfaces as well as a reduced tendency to develop splay upon molding into parts. These advantages are particularly unexpected given the generally unremarkable thermal stability of alkylene oxide copolymers.

DETAILED DESCRIPTION OF THE INVENTION

The present invention is a thermoplastic molding composition comprising 100 parts by weight of a blend of an ABS copolymer and a copolymer of an unsaturated dicarboxylic acid anhydride, and about 0.1 to about 5 parts by weight of an alkylene oxide copolymer.

The ABS copolymer useful in the present invention may be any of a variety of ABS copolymer compositions known in the art. Although originally the term "ABS" denoted a copolymer primarily constructed from acrylonitrile, butadiene and styrene, this definition has been expanded in recent years to include copolymer resins in which these components have been replaced in whole or in part by closely analogous compounds. In general, however, ABS copolymers are understood to be graft copolymers which comprise a vinyl aromatic compound, an acrylic compound, and a rubber substrate.

The vinyl aromatic compound useful in the present invention may be any of a variety of copolymerizable vinyl aromatic compounds, such as alpha-methyl styrene, halogenated styrenes such as chlorostyrene and dibromostyrene, alkyl styrenes such as vinyl toluene, vinyl pyridine and styrene. Mixtures of different vinyl aromatic compounds may also be used. It is preferred, however, that the vinyl aromatic compound be selected from the group consisting of styrene, halogenated styrenes, alpha-methyl styrenes, alkyl styrenes and mixtures thereof. In the embodiment which is most preferred, the ABS graft copolymer includes at least some styrene.

The acrylic compound useful in the present invention is any copolymerizable acrylic compound, such as acrylonitrile, halogenated acrylonitriles, methacrylonitrile, ethacrylonitrile, further alkyl acrylonitrile derivatives, and other non-nitrilated acrylic compounds, such as acrylates, methacrylates, methyl methacrylates, ethylacrylates and acrolein, and mixtures thereof. However, due to the fact that compounds other than acrylonitrile, such as methyl methacrylate, are generally more expensive, their use may be minimized due to cost considerations even though they may form compositions with satisfactory properties. Acrylonitrile, methacrylonitrile and methyl methacrylate are the more preferred acrylic compounds. Most preferably, at least some acrylonitrile is included, such as in ABS graft copolymers which contain acrylonitrile as the principle acrylic compound while including a lesser amount of methyl methacrylate.

The rubber substrate may be any of a variety of rubber substrates. As is known in the art, the choice of rubber substrate may depend upon the intended use of the molded part, as some rubbers may be more appropriate for some uses than for others. However, for most applications rubbers which include a diene rubber are preferred. Particularly preferred rubbers are polybutadiene rubbers and butadiene copolymer rubbers, such as copolymers of butadiene containing up to 35% of a copolymerizable monomer such as an acrylonitrile, an alkyl acrylate, an alkyl methacrylate or a vinyl aromatic monomer such as styrene. Alternatively, other rubber substrates may be employed, such as butyl acrylate rubbers when enhanced weatherability characteristics are desired. Alternative materials include saturated rubbers such as EPDM (ethylene-propylene-diene) rubber, EPM (ethylene-propylene) rubber, polypentenamer, and acrylic rubbers derived from alykl acrylate homopolymer or copolymers. Such rubbers may also include small amounts of di- or tri-functional crosslinking and graft linking monomers.

As is known in the art, the ABS graft copolymers useful in the present invention may also include minor amounts of various additives to improve the properties of the resin. Such additives include crosslinking monomers such as divinyl benzene, ethylene glycol dimethacrylate, alkyl methacrylates and the like. These additives may be included in the rubber or along with the grafting monomers, as is known in the art.

A great many of these ABS graft copolymers are widely available commercially, or may be prepared according to any of a variety of known graft polymerization techniques. One such method involves copolymerizing the acrylic monomer and the vinyl aromatic monomer in the presence of the previously formed rubber substrate. Typical methods for preparing traditional ABS graft polymers from styrene and acrylonitrile are found in U.S. Pat. No. 3,238,275. Also included in the invention as ABS graft copolymers are ABS-type resins prepared by blending a graft copolymer having a high rubber substrate content with a preformed rigid copolymer, such as a styrene-acrylonitrile copolymer (SAN), an acrylonitrile-alphamethylstyrene, styrene copolymer or the like.

Although the proportion of rubber, acrylic compound and vinyl aromatic compound in the ABS copolymer is not critical to the invention, in the preferred embodiment the ABS copolymer includes about 20 to about 80 parts by weight rubber; about 5 to about 30 parts by weight of the acrylic compound; and about 15 to about 70 parts by weight of the vinyl aromatic compound.

Similarly, the copolymer of the unsaturated dicarboxylic acid anhydride may be any of a variety of anhydride copolymers. Suitable copolymers are commercially available or may be prepared using means known in the art. The anhydride compound useful in the anhydride copolymer may be any of a variety of alpha,beta-unsaturated cyclic anhydrides, such as maleic anhydride, citriconic anhydride, itaconic anhydride, aconitic anhydride and the like. However, maleic anhydride is preferred.

This anhydride compound is usually copolymerized with a vinyl aromatic compound, consistent with those vinyl aromatic compounds described above as useful in conjunction with the ABS copolymer, such as alpha-methylstyrene, para-methylstyrene, halogenated styrenes such as chlorostyrene and dibromostyrene, alkylstyrenes such as vinyl toluene, vinyl pyridine and styrene. Mixtures of different vinyl aromatic compounds may also be used. However, styrenes, such as para-methylstyrene and styrene are preferred. Styrene is most preferred.

Although the proportion of vinyl aromatic components and anhydride compound in the copolymer is not critical to the present invention, it is preferred that the anhydride copolymer include about 95 to about 60 parts by weight of a vinyl aromatic compound and about 5 to about 40 parts by weight of the unsaturated dicarboxylic acid anhydride compound per 100 parts anhydride copolymer. More preferably the anhydride copolymer includes about 85 to about 62 parts by weight of the vinyl aromatic compound and about 15 to about 38 parts by weight of the anhydride compound per 100 parts anhydride copolymer.

The anhydride copolymer may also further comprise up to about 30 parts by weight of a copolymerizable monomer per 100 parts anhydride copolymer. Such copolymerizable monomers may include olefins, aliphatic or aromatic esters of unsaturated acids, unsaturated ethers, unsaturated nitriles, vinyl halides, vinyl esters and the like. Preferably, the copolymerizable monomer is an acrylonitrile, such as acrylonitrile or methacrylonitrile, or an alkyl ester of an acrylic acid, such as methyl methacrylate, or mixtures thereof. Acrylonitrile is most preferred. When acrylonitrile is included as a copolymerizable monomer, the acrylonitrile more preferably is present in about 5 to about 20 parts by weight per 100 parts anhydride copolymer.

In addition to or instead of including a copolymerizable monomer, the anhydride copolymer may include a rubber, such as those rubbers described above for the ABS copolymer. This rubber preferably is present as of a graft substrate. It is preferred that no more than 25 parts by weight rubber are included in the anhydride copolymer, based on 100 parts by weight for the anhydride copolymer composition, including any rubber.

In one embodiment, not necessarily preferred, the thermoplastic composition of the invention also includes an aromatic polycarbonate. Polycarbonates useful in a preferred embodiment generally are polycarbonates of the bisphenol type, and are commercially available or may be made by means known in the art. Polycarbonates useful in the preferred embodiment are usually those derived from 2,2-(4,4'-dihydroxydiphenyl)propane. Other polycarbonates useful in the present invention include those derived from other substituted aliphatic hydrocarbons, such as the polycarbonates of (4,4'-dihydroxydiphenyl)methane; 1,1-(4,4'-hydroxydiphenyl)-cyclohexane; 2,2-(4,4'-dihydroxydiphenyl)-butane; 2,2-(4,4'-dihydroxydiphenyl)-pentane; 2,2(4,4'-dihydroxydiphenyl)hexane; and 2,2-(4,4'-dihydroxydiphenyl)-heptane; as well as polycarbonates derived from alkyl substituted bisphenols, such as tetramethyl bis-phenol A. Substituents on the aromatic moieties of the polycarbonate, such as halogens, may be expected to improved compatibility of the polycarbonate with other blend components, but are not necessary. Mixtures of various bisphenol compounds may also be used. It is also contemplated these bisphenols may be copolymerized with any of a variety of compatible monomers to form polycarbonate copolymers with desirable characteristics, such as polyester copolymers, like polyester polycarbonates of bisphenol A, phosgene, and isophthalic and/or terephthalic acid chloride.

The appropriate proportion of ABS copolymer to the anhydride copolymer and, when applicable, to the polycarbonate depends at least in part on the process conditions and the end use intended for the molded product. Usually, however, the blend includes about 5 to about 95 parts by weight of the ABS copolymer, about 5 to 95 parts by weight of the anhydride copolymer, and 0 to about 80 parts by weight of the polycarbonate. Preferably, however, when the polycarbonate is included, the blend includes about 5 to about 35 parts by weight of the ABS copolymer, about 25 to 70 parts by weight of the anhydride copolymer, and about 20 to about 60 parts by weight of the polycarbonate when the polycarbonate is included. When the polycarbonate is not included, the blend preferably includes about 80 to about 20 parts of the ABS copolymer and about 20 to about 80 parts of the anhydride copolymer.

As described above, the present invention is a thermoplastic molding composition including an ABS copolymer and a copolymer of an unsaturated dicarboxylic acid anhydride, wherein the improvement comprises the composition including a minor portion of an alkylene oxide copolymer.

Suitable alkylene oxide copolymers are available commercially or may be synthesized by means known in the art. This alkylene oxide copolymer should be present in an amount sufficient to diminish sticking and surface defects upon molding of the ABS/anhydride copolymer blend. However, if too much alkylene oxide copolymer is present, discrete domains of alkylene oxide copolymer may exist in the composition after molding. Also, too much alkylene oxide copolymer may result in the composition balling up in the mixer, thereby precluding proper mixing. As discrete alkylene oxide copolymer domains are anticipated to impair the physical properties of the part, such as its impact resistance, and high heat properties, and as adequate mixing is virtually necessary in order to obtain a commercially useful composition, use of excess of alkylene oxide copolymer preferably is avoided. For the most compositions, amounts of at least 0.1 parts by weight of the alkylene oxide copolymer, based on 100 parts by weight of the blend, will be required. Due to the considerations discussed above, for most compositions the alkylene oxide copolymer should be present in an amount equal to or less than 5 parts by weight, based on 100 parts by weight of the ABS/anhydride copolymer blend. Amounts of about 0.2 to about 3 parts by weight of the alkylene oxide copolymer are more preferred.

This alkylene oxide copolymer is a copolymer formed from the polymerization of more than one alkylene oxide monomer, such as ethylene oxide, propylene oxide or butylene oxide. Copolymers of ethylene oxide and propylene oxide are preferred.

Although the alkylene oxide copolymer may be formed by copolymerizing the different monomers in the presence of each other to form a random or alternating copolymer, it is preferred that the alkylene oxide copolymer be a block copolymer. Block copolymers of ethylene oxide and propylene oxide are particularly preferred.

Preferably the alkylene oxide copolymer has a molecular weight of about 1500 to about 16,000. When the copolymer is a block copolymer of ethylene oxide and propylene oxide, it is further preferred that the block copolymer comprise about 10% to about 90% by weight polyoxyethylene, and more preferably about 20% to about 85% by weight polyoxyethylene. It is also preferred that the block copolymer include polyoxypropylene blocks having a molecular weight of about 950 to about 4,000 per block.

In addition, the thermoplastic composition of the present invention may include other additives known in the art, such a polysiloxanes, fatty acid amides, and fatty acid metal salts. Examples of polysiloxanes useful in the preferred embodiment of the invention are polydialkylsiloxanes, such as poly(dimethyl)siloxanes, poly(alkyl aryl)siloxanes, such as poly(methylphenyl)siloxanes or polydiarylsiloxanes such as polydiphenylsiloxane. Preferably, polysiloxanes are present in an amount equal to about 0.05 to about 0.5 parts by weight of said composition.

In addition to or instead of the polysiloxane, the composition may include about 0.1 to about 1.5 parts by weight of a $C_{12}$ to $C_{20}$ fatty acid amide of an alkylenediamine. Such fatty acid amides are known in the art and include compositions such as N,N'-ethylene-bis-stearamide or "EBS wax".

Instead of or in addition to the amide of the alkylene diamine and/or the polysiloxane, the composition of the present invention may include about 0.1 to about 2 parts by weight of a metal salt of a $C_{12}$ to $C_{20}$ fatty acid, such as calcium stearate or magnesium stearate.

The ABS copolymer, the anhydride copolymer, the alkylene oxide copolymer and, when included, the polycarbonate and any additives may be combined using known means, such as mixing in a Banbury mixer at a temperature high enough to plasticize the components. Banbury mixing is usually followed by milling on a two roll mill, followed by feeding to a pelletizing device. An extruder may also be used to mix the present composition.

In addition to the above description, the process of the present invention may be understood by reference to the illustrative non-limiting examples provided below.

SPECIFIC EMBODIMENTS

Unless noted otherwise, the compositions presented below in the following examples and comparative examples were blended by mixing the various polymers and additives in a Banbury mixer at about 330° to 360° F., followed by working on a hot two-roll mill to produce a flat sheet. This sheet was cooled and cut into strips for grinding. After grinding the material was injection molded.

The quality of the molded surface was rated for splay by superimposing a one-half inch square grid over a four-inch diameter molded plaque. Sixty of the sixty-four squares of the grid covered the plaque surface. The appearance of the molded surface underlying each square was rated as follows: 0-no splay; 1-light splay; 2-medium splay (splay extending through half the area); 3-heavy splay; 4-very heavy or severe surface degradation. The ratings for each of the squares for a given plaque were added to obtain a total value for each plaque. As is apparent, a splay rating of 0 indicates that no surface splay was observed for a given plaque, while a splay rating of 240 would be the worst splay rating possible.

Sample formulations were molded at melt temperatures of both 500° and 525° F., as a slight increase in stock temperature may have a dramatic effect on the splay exhibited by a given composition. For example, Cadon 127 and 160, polymer blends containing maleic anhydride and produced by the Monsanto Corporation, exhibited no splay when molded at a stock temperature of 500° F., but had splay ratings of 136 and 118, respectively, when molded at a stock temperature of 525° F.

The lubricating properties of the various compositions in the Banbury mixer and on the rolling mill were rated as follows: 4-extreme stickiness, composition difficult to remove from either the mill or the Banbury mixer; 3-some degree of difficulty encountered in removing the material from the Banbury mixer or the mill; 2-sticky areas of 1-inch square or larger or some sticky spots on rotor in the Banbury mixer; 1-small spots of molten plastic adhering to the metal surface; 0-no tendency to stick to any of the metal surfaces.

The following components were employed in the examples and comparative examples. The polycarbonates include Lexan 105, a polycarbonate available from the General Electric Corporation, and Merlon M-50, from the Mobay Chemical Company.

Dylark 332 and Dylark 338 are styrenic-maleic anhydride copolymers containing about 12% maleic anhydride and are manufactured by ARCO (formerly the Atlantic Richfield Oil Company). Dylark 338 also includes about 7% by weight rubber incorporated during polymerization. SAN-MA is a terpolymer containing about 72 parts styrene, about 8 parts acrylonitrile and about 20 parts maleic anhydride.

The ABS copolymers employed in the following examples are graft copolymers. ABS-1 contains 60 parts by weight rubber, 28 parts by weight styrene and 12 parts acrylonitrile. ABS-2 contains 30 parts rubber, 45 parts styrene and 25 parts acrylonitrile. ABS-3 contains 12 parts rubber, approximately 57 parts styrene and approximately 31 parts acrylonitrile. ABS-4 contains 70 parts by weight rubber, about 22.5 parts styrene and about 7.5 parts acrylonitrile.

Pluronic F-88 ("F-88") is a polyoxyethylene/polyoxypropylene/polyoxyethylene block copolymer wherein the polyoxyethylene blocks contain about 97 monomer units and the polyoxypropylene block includes approximately 39 monomer units, giving F-88 a molecular weight of about 10,800. F-88 is available from BASF/Wyandotte Corporation. L-64 is an alkylene oxide block copolymer available from the Borg-Warner Chemicals Corporation. P-104 is an alkylene oxide block copolymer available from BASF Wyandotte. Both P-104 and L-64 are 40% by weight polyoxyethylene units. P-104 is a paste containing polyoxypropylene blocks of about 56 units and having a molecular weight of about 5,040. L-64 is a liquid with 30 units of polyoxypropylene and a molecular weight of 2,900.

EBS Wax is N,N'ethylene-bis-stearamide, available from a variety of commercial sources. The silicone fluid indicated in the examples below is a polydimethylsiloxane having a viscosity of about 1,000 centistokes and is available from the Dow Corning Corporation. Ethanox 330 antioxidant, available from the Ethyl Corporation, is 1,3,5-trimethyl-2,4,6,-tris[3,5-ditertiarybutyl-4-hydroxybenzyl] benzene.

EXAMPLES 1 (A–K)

Example 1A is a non-ABS containing blend of a styrene-maleic anhydride copolymer which contains rubber (Dylark 338) with a styrene/acrylonitrile/maleic anhydride copolymer (SAN-MA) which does not contain rubber, to provide a basis for comparing ABS-containing compositions. Examples 1B through 1K are various blends of ABS and maleic anhydride copolymer resins. Example 1B is also a comparative example in that the rubber in the blend is contributed by ABS, but no alkylene oxide copolymer is included. Examples 1C through 1K, wherein an alkylene oxide copolymer is included, represent various embodiments of the present invention. The components and their parts by weight for the various compositions are presented below in Table I. Mixing was performed as described above.

Compositions 1A and 1B experienced significant sticking problems in the Banbury mixer and mill. However, compositions C–K, which contained an alkylene oxide copolymer consistent with the invention, experienced almost no sticking in the Banbury and mill, indicating that blends of ABS and anhydride copolymers which include a minor portion of an alkylene oxide copolymer may exhibit improved mixing and milling properties.

EXAMPLES 2 (A–I)

Various compositions not embodying the invention were made by blending appropriate ABS and anhydride copolymer resins, without including an alkylene oxide copolymer. The compositions of Examples 2A through 2I provide a basis for comparing the properties of similar compositions containing a minor portion of an alkylene oxide copolymer consistent with the present invention. These compositions were made by charging the ABS copolymer to a Banbury mixer, followed by charging the maleic anhydride copolymer resin and the polycarbonate resin. After mixing in the Banbury the resin blends were sheeted off a mill. The components contained in compositions 2A through 2I and the parts by weight of each component are indicated below in Table II. All blends in these comparative examples displayed sticking tendencies in the Banbury mixer and on the mill.

EXAMPLES 3 (A–F)

Various compositions embodying the present invention were prepared using the components and proportions indicated below in Table III. In addition to the additives employed in Examples 2 (A–I), all compositions of Examples 3 (A–F) included 0.5 parts of Pluronic F-88. These compositions did not display sticking in the Banbury mixer and on the mill.

EXAMPLES 4 (A–E)

Compositions consistent with various embodiments of the invention were prepared using the components and parts by weight indicated below in Table IV. These compositions included Ethanox 330 antioxidant; however, none of these compositions included EBS wax. All compositions were mixed and milled as described above. However, these compositions did not display sticking in either the Banbury mixer or the mill, indicating that compositions consistent with the present invention may show improved properties even when EBS Wax, frequently a standard additive, is omitted.

EXAMPLES 5 (A-E)

The compositions of Examples 5A through 5E do not embody the invention, but are provided herein for the purposes of comparison. The components and their proportions for these compositions are indicated in Table V. As indicated by the Banbury and Mill Ratings in Table V, all of the compositions of Examples 5A-5E were extremely sticky and adhered to the metal surface. In addition, the splay ratings for some of the compositions corroborated them as being inferior to other formulations.

EXAMPLES 6 (A-F)

Various alkylene oxide copolymers were tested in compositions embodying the present invention to determine the alkylene oxide copolymers' relative effectiveness in diminishing sticking and splay without the presence of other additives. The identity and amount of these alkylene oxide copolymers, and their effect on sticking and splay are indicated below in Table VI. These data indicate that compositions consistent with the present invention may demonstrate improved processing and molding characteristics even in the absence of other additives.

EXAMPLES 7 (A-F)

Various compositions were made by blending SAN-MA with ABS-1 using various combinations of additives. These compositions, their components and proportions are indicated below in Table VII. The compositions of Examples 7A, 7C, 7D and 7F are embodiments of the invention. The compositions of Examples 7B and 7E do not embody the invention, but are provided here for the purposes of comparison. The compositions of Examples 7 (A-F) were injection molded at melt temperatures of 500° F. and 525° F., and the splay ratings of the injection molded parts determined. These ratings are also indicated below in Table VII. The presence or absence of stickiness during compounding is also noted in Table VII. These data suggest the effect of the alkylene oxide copolymer may be moderated by the presence of various additive combinations.

EXAMPLES 8 (A-G)

ABS copolymer/anhydride copolymer blends containing a minor portion of an alkylene oxide copolymer, consistent with the invention, were blended with various combinations of a polydimethylsiloxane and EBS wax and magnesium stearate to assess the effectiveness of alkylene oxide copolymers in reducing sticking and splay in combination with these other additives. The results of mixing and molding of these compositions are indicated below in Table VIII. These data indicate the effect of various non-alkylene oxide additives on various embodiments of the invention.

EXAMPLES 9

A composition including 60 parts Dylark 338, 25 parts ABS-1 and 10 parts SAN-MA, without containing an alkylene oxide copolymer, was blended in a Banbury mixer. This composition displayed a tendency to adhere to the metal surfaces and would not mill at the standard conditions (80 psi steam pressure) used for the other samples discussed above. Pluronic F-88, 0.5 phr, was added to the composition. After addition of the F-88, the composition displayed reduced stickiness and the hot resin could be sheeted in the mill, thereby demonstrating the improved processability which may be possible with compositions of the present invention.

EXAMPLES 10 (A-C)

Three batches were made having the same polycarbonate, ABS and anhydride copolymer composition, but including different combinations of polydimethylsiloxane and Pluronic F-88. These compositions are detailed in Table IX. As Table IX indicates, none of the compositions was sticky in the Banbury mixer, but the compositions containing only siloxane or only alkylene oxide copolymer as the additive were slightly tacky on the mill. All three blends displayed no splay when injection molded as 500° F., and only the first batch, which included both polydimethylsiloxane and alkylene oxide copolymer, showed a slight splay rating of 1 when injection molded at 525° F., indicating that, depending on processing and molding conditions, and whether slight splay is acceptable in the product, it may be preferable to include a silicone fluid in some compositions of the invention.

EXAMPLES 11 (A-C)

The procedure of Examples 10 (A-C) was repeated, except that a SAN-MA terpolymer was substituted for the Dylark 332. These compositions are detailed below in Table X. As indicated in Table X all three batches were mixed in the Banbury mixer with no sticking. The batch for Example 11 B, containing only the polydimethylsiloxane additive, would not mill, so was not molded or rated. As indicated by the data presented in Table X, whether the inclusion of a polysiloxane in some compositions of the invention is or is not preferred may depend on the conditions for molding. As many commerical molders prefer to run the molding operation as hot (and therefore as fast) as possible, the composition of Example 11C, wherein no polysiloxane is present, may be preferred to the composition of 11A wherein polysiloxane is included.

EXAMPLES 12 (A-D)

Examples 12 (A-D) represent various samples wherein the ABS includes 38.6 parts of styrene and 15.45 parts of acrylonitrile grafted onto a poly(butylacrylate) substrate (46 parts). The samples for Examples 12 A and 12C, which include an alkylene oxide copolymer, are consistent with the invention. Examples 12B and 12D do not embody the invention, but are provided for the purpose of comparison. Samples were injection molded at 500° F. and at 550° F., and the results indicated below in Table XI. As the data presented therein indicate, compositions of the present invention which include acrylate rubbers may show improvement over comparative compositions.

TABLE I

| EXAMPLES 1 | A | B | C | D | E | F | G | H | I | J | K |
|---|---|---|---|---|---|---|---|---|---|---|---|
| Component | | | | | | | | | | | |
| Dylark 338 | 50 | — | — | — | — | — | 40 | 50 | — | — | 37.5 |
| Dylark 332 | — | — | — | 10 | 10 | 40 | — | — | 50 | 37.5 | — |
| SAN-MA | 50 | 50 | 50 | 65 | 40 | 10 | 10 | 25 | 25 | 37.5 | 37.5 |
| ABS-1 | — | — | — | 25 | — | — | — | 25 | 25 | 25 | 25 |
| ABS-2 | — | — | 50 | — | 50 | 50 | 50 | — | — | — | — |
| ABS-3 | — | 50 | — | — | — | — | — | — | — | — | — |
| Additive: | | | | | | phr | | | | | |
| F-88 | — | — | 0.5 | 0.5 | 0.5 | 0.5 | 0.5 | 0.5 | 0.5 | 0.5 | 0.5 |
| All Samples | | | | | | | | | | | |
| EBS Wax | 0.5 phr | | | | | | | | | | |
| Mg Stearate | 0.5 phr | | | | | | | | | | |
| Silicone Fluid | 0.2 phr | | | | | | | | | | |

TABLE II

| EXAMPLES 2 | A | B | C | D | E | F | G | H | I |
|---|---|---|---|---|---|---|---|---|---|
| Component | | | | | | | | | |
| Lexan 105 | 5 | 10 | 5 | 10 | 10 | 10 | 10 | 20 | 10 |
| Dylark 338 | 60 | 60 | — | — | — | — | — | — | — |
| Dylark 332 | — | — | — | — | 60 | — | — | — | 30 |
| SAN-MA | 10 | 10 | 45 | 40 | 10 | 40 | 65 | 40 | 30 |
| ABS-1 | 25 | 25 | — | — | 25 | — | 25 | — | — |
| ABS-2 | — | — | 50 | 50 | — | — | — | 40 | 30 |
| ABS-3 | — | — | — | — | — | 50 | — | — | — |
| Additive: | | | | | | | | | |
| All Samples | | | | | | | | | |
| EBS Wax | 0.5 phr | | | | | | | | |
| Mg Stearate | 0.5 phr | | | | | | | | |
| Silicone Fluid | 0.2 phr | | | | | | | | |

TABLE III

| EXAMPLES 3 | A | B | C | D | E | F |
|---|---|---|---|---|---|---|
| Component | | | | | | |
| Lexan 105 | 10 | 10 | 5 | 10 | 15 | 20 |
| Dylark 332 | 35 | — | — | — | — | — |
| Dylark 338 | — | 35 | — | — | — | — |
| SAN-MA | 35 | 35 | 90 | 80 | 70 | 60 |
| ABS-1 | 20 | 20 | 5 | 10 | 15 | 20 |
| Additive: | | | | | | |
| All Samples | | | | | | |
| F-88 | 0.5 phr | | | | | |
| EBS Wax | 0.5 phr | | | | | |
| Mg Stearate | 0.5 phr | | | | | |
| Silicone Fluid | 0.2 phr | | | | | |

TABLE IV

| EXAMPLES 4 | A | B | C | D | E |
|---|---|---|---|---|---|
| Component | | | | | |
| SAN-MA | 50 | 55 | 75 | 68.4 | 78.6 |
| ABS-1 | — | — | 25 | 31.6 | — |
| ABS-2 | 50 | 45 | — | — | — |
| ABS-4 | — | — | — | — | 21.4 |
| Additive: | | | | | |
| All Samples | | | | | |
| F-88 | 0.5 phr | | | | |
| Ethanox 330 | 0.2 phr | | | | |
| Mg Stearate | 0.5 phr | | | | |
| Silicone Fluid | 0.2 phr | | | | |

TABLE V

| EXAMPLES 5 | A | B | C | D | E |
|---|---|---|---|---|---|
| Component | | | | | |
| SAN-MA | 75 | 75 | 75 | 75 | 75 |
| ABS-1 | 25 | 25 | 25 | 25 | 25 |
| Additive: | | | phr | | |
| EBS Wax | 0.5 | 1.0 | — | — | — |
| Mg Stearate | — | — | 0.5 | 1.0 | — |
| Silicone Fluid | — | — | — | — | 0.5 |
| Banbury Rating | 4 | 4 | 4 | 3 | 4 |
| Mill Rating | 4 | 4 | 4 | 4 | 4 |
| Splay Rating: | | | | | |
| @ 500° F. | 7 | 10 | 2 | 5 | 5 |
| @ 525° F. | 138 | 169 | 9 | 5 | 6 |

TABLE VI

| EXAMPLES 6 | A | B | C | D | E | F |
|---|---|---|---|---|---|---|
| Components | | | | | | |
| SAN-MA | 75 | 75 | 75 | 75 | 75 | 75 |
| ABS-1 | 25 | 25 | 25 | 25 | 25 | 25 |
| Additive: | | | phr | | | |
| P104 | 0.2 | 0.5 | — | — | — | — |
| F-88 | — | — | 0.2 | 0.5 | 1.0 | — |
| L-64 | — | — | — | — | — | 0.2 |
| Banbury Rating | 2 | 0 | 0 | 0 | 0 | 4 |
| Mill Rating | 4 | 0 | 0 | 0 | 0 | 4 |
| Splay Rating: | | | | | | |
| @ 500° F. | 5 | 2 | 3 | 10 | 1 | 6 |
| @ 525° F. | 17 | 19 | 13 | 15 | 5 | 15 |

TABLE VII

| EXAMPLES 7 | A | B | C | D | E | F |
|---|---|---|---|---|---|---|
| Components | | | | | | |
| SAN-MA | 75 | 75 | 75 | 75 | 75 | 75 |
| ABS-1 | 25 | 25 | 25 | 25 | 25 | 25 |
| Additive: | | | phr | | | |
| F-88 | 0.5 | — | 0.5 | 0.5 | — | 0.2 |
| EBS Wax | — | 1.0 | 1.0 | 2.0 | 2.0 | 1.0 |
| Mg Stearate | 0.5 | 0.5 | 0.5 | — | — | — |
| Silicone Fluid | 0.2 | 0.2 | — | 0.2 | 0.2 | — |
| Sticky | no | yes | yes | no | no | no |
| Splay Rating: | | | | | | |
| @ 500° F. | 0 | 4 | 7 | 7 | 3 | 1 |
| @ 525° F. | 2 | 23 | 158 | 158 | 166 | 27 |

TABLE VIII

| EXAMPLES 8 | A | B | C | D | E | F | G |
|---|---|---|---|---|---|---|---|
| Component | | | | | | | |
| SAN-MA | 75 | 75 | 75 | 75 | 75 | 75 | 75 |
| ABS-1 | 25 | 25 | 25 | 25 | 25 | 25 | 25 |
| Additive: | | | | | | | |
| P104 | 0.2 | — | — | — | 0.2 | — | — |
| F-88 | — | 0.2 | — | 0.2 | — | 0.2 | — |
| L-64 | — | — | 0.2 | — | — | — | 0.2 |
| EBS Wax | 0.5 | 0.5 | 0.5 | 0.2 | — | — | — |
| Mg Stearate | — | — | — | — | 0.5 | 0.5 | 0.5 |
| Silicone Fluid | 0.2 | 0.2 | 0.2 | 0.5 | — | — | — |
| Banbury Rating | 1 | 2 | 1 | 0 | 4 | 4 | 4 |
| Mill Rating | 0 | 2 | 3 | 2 | 3 | 4 | 4 |
| Splay Rating | | | | | | | |
| @ 500° F. | 15 | 10 | 12 | 6 | 8 | 2 | 10 |
| @ 525° F. | 145 | 63 | 150 | 75 | 19 | 6 | 21 |

TABLE IX

| EXAMPLES 10 | Parts by Weight | | |
|---|---|---|---|
| | A | B | C |
| Components | | | |
| Merlon M50 | 30 | 30 | 30 |
| Dylark 332 | 45 | 45 | 45 |
| ABS-1 | 25 | 25 | 25 |
| Additive | | phr | |
| F-88 | 0.5 | — | 0.5 |
| Silicone Fluid | 0.5 | 0.5 | — |
| Banbury Rating | 0 | 0 | 0 |
| Mill Rating | 0 | 1 | 1 |
| Splay Rating: | | | |
| @ 500° F. | 0 | 0 | 0 |
| @ 525° F. | 1 | 0 | 0 |

TABLE X

| EXAMPLES 11 | Parts by Weight | | |
|---|---|---|---|
| | A | B | C |
| Component | | | |
| Merlon M50 | 30 | 30 | 30 |
| SAN-MA | 45 | 45 | 45 |
| ABS-1 | 25 | 25 | 25 |
| Additive: | | phr | |
| F-88 | 0.5 | — | 0.5 |
| Silicone Fluid | 0.5 | 0.5 | — |
| Banbury Rating | 0 | 0 | 0 |
| Mill Rating | 0 | — | 0 |
| Splay Rating: | | | |
| @ 500° F. | 2 | — | 3 |
| @ 525° F. | 6 | — | 3 |

TABLE XI

| EXAMPLES 12 | Parts by Weight | | | |
|---|---|---|---|---|
| | A | B | C | D |
| Component | | | | |
| Merlon M50 | — | — | 30 | 30 |
| SAN-MA | 39 | 39 | 31 | 31 |
| ABS-Acrylate | 61 | 61 | 39 | 39 |
| Additive: | | phr | | |
| F-88 | 0.5 | — | 0.5 | — |
| All Samples: | | | | |
| Ethanox 330 | 0.2 phr | | | |
| Mg Stearate | 0.5 phr | | | |
| Silicone Fluid | 0.2 phr | | | |
| Splay Rating | | | | |
| @ 500° F. | 4 | 4 | 10 | 3 |
| @ 550° F. | 83 | 111 | 5 | 29 |

It will be understood that various changes and modifications may be made in the embodiments outlined above without departing from the spirit of the invention, which includes all equivalents and modifications thereof and is limited only by the following claims.

We claim:

1. A thermoplastic molding composition comprising a blend of an ABS copolymer and a copolymer of an unsaturated dicarboxylic acid anhydride, and a minor portion of an alkylene oxide block copolymer, wherein said alkylene oxide block copolymer consists essentially of polyoxyethylene and polyoxypropylene blocks.

2. The composition of claim 1 wherein said alkylene oxide copolymer has a molecular weight of about 1500 to about 16,000.

3. The composition of claim 1 wherein said alkylene oxide copolymer is a block copolymer which includes about 10% to about 90% by weight polyoxyethylene.

4. The composition of claim 1 wherein said alkylene oxide copolymer is a block copolymer which includes polyoxypropylene with a molecular weight of about 950 to about 4000.

5. The composition of claim 1 wherein said blend includes:
   (a) about 5 to about 95 parts by weight of said ABS copolymer;
   (b) about 5 to about 95 parts by weight of said anhydride copolymer; and
   (c) about 0 to about 80 parts by weight of a polycarbonate.

6. The composition of claim 5 wherein said blend includes:
   (a) about 5 to 35 parts by weight of said ABS copolymer;
   (b) about 25 to 70 parts by weight of said anhydride copolymer; and
   (c) about 20 to about 60 parts by weight of said polycarbonate.

7. The composition of claim 5 wherein said ABS copolymer includes:
   (a) about 20 to about 80 parts by weight rubber;
   (b) about 5 to about 30 parts by weight of an acrylic compound; and
   (c) about 15 to 70 parts by weight of a vinyl aromatic compound.

8. The composition of claim 5 wherein said anhydride copolymer is a copolymer of a vinyl aromatic compound and an unsaturated dicarboxylic acid anhydride compound.

9. The composition of claim 8 wherein said anhydride copolymer includes about 95 to about 60 parts by weight of said vinyl aromatic compound, about 5 to about 40 parts by weight of said unsaturated dicarboxylic acid anhydride compound, and 0 to about 25 parts by weight rubber per 100 parts anhydride copolymer.

10. The composition of claim 8 wherein said vinyl aromatic compound is styrene and said anhydride compound is maleic anhydride.

11. The composition of claim 9 wherein said anhydride copolymer additionally includes up to 30 parts by weight of copolymerizable monomer, per 100 parts anhydride copolymer, wherein the copolymerizable monomer is selected from the group consisting of acrylonitrile, methacrylonitrile and methyl methacrylate and mixtures thereof.

12. The composition of claim 1 wherein said alkylene oxide copolymer is present in an amount equal to about 0.1 to about 5 parts by weight.

13. The composition of claim 12 wherein said alkylene oxide copolymer is present in an amount equal to 0.2 to about 3 parts by weight.

14. The composition of claim 1 wherein said composition additionally includes at least one of a polysiloxane, a $C_{12}$ to $C_{20}$ fatty acid amide of an alkylene diamine and a metal salt of a $C_{12}$ to $C_{20}$ fatty acid.

15. The composition of claim 5 wherein said blend includes:
   (a) about 80 to 20 parts of said ABS copolymer;
   (b) about 20 to about 80 parts of said anhydride copolymer; and
   (c) 0 parts of said polycarbonate.

16. A thermoplastic molding composition comprising:
   (a) 100 parts by weight of a blend of an ABS copolymer and a copolymer of an unsaturated dicarboxylic acid anhydride; and
   (b) about 0.1 to about 5 parts by weight of an alkylene oxide block copolymer, wherein said alkylene oxide block copolymer consists essentially of polyoxyethylene and polyoxypropylene blocks.

* * * * *